(12) United States Patent
Yamada et al.

(10) Patent No.: US 8,639,905 B2
(45) Date of Patent: *Jan. 28, 2014

(54) MICROCONTROLLER AND ELECTRONIC CONTROL UNIT

(75) Inventors: Hiromichi Yamada, Hitachi (JP); Yuichi Ishiguro, Kasugai (JP); Nobuyasu Kanekawa, Hitachi (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,313

(22) Filed: Sep. 13, 2012

(65) Prior Publication Data

US 2013/0013881 A1    Jan. 10, 2013

Related U.S. Application Data

(63) Continuation of application No. 12/706,938, filed on Feb. 17, 2010, now Pat. No. 8,291,188.

(30) Foreign Application Priority Data

Feb. 25, 2009    (JP) .................................. 2009-042510

(51) Int. Cl.
*G06F 12/02* (2006.01)

(52) U.S. Cl.
USPC ......................................................... 711/170

(58) Field of Classification Search
None
See application file for complete search history.

(56) References Cited

U.S. PATENT DOCUMENTS

| 5,274,795 A | 12/1993 | Vachon |
| 5,848,238 A | 12/1998 | Shimomura et al. |
| 2007/0124559 A1 | 5/2007 | Yamada et al. |

FOREIGN PATENT DOCUMENTS

| JP | 8-328888 A | 12/1996 |
| JP | 10-261762 A | 9/1998 |

OTHER PUBLICATIONS

Japanese Office Action received in Japanese Application No. 2009-042510 dated Dec. 3, 2013.

*Primary Examiner* — Duc Doan
(74) *Attorney, Agent, or Firm* — Mattingly & Malur, PC

(57) ABSTRACT

A microcontroller in which respective CPUs execute different applications so as to improve processing performance, and the respective CPUs execute an application that requires safety and mutually compare the results thereof so as to enhance the reliability of write data is provided. The microcontroller has a plurality of processing systems made up of a first CPU, a second CPU, a first memory and a second memory, and for the instruction processing about specific processing set in advance, the write to peripheral modules which are not multiplexed is executed twice, and the write data of the first time and the second time are mutually collated.

7 Claims, 14 Drawing Sheets

FIG. 11

| REGISTRATION NUMBER | ADDRESS TABLE | ATTRIBUTE REGISTER | DATA REGISTER |
|---|---|---|---|
| | BYTE ADDRESS | CPU NUMBER / NUMBER OF WRITES | |
| 0 | AR0  7─────0 | CR0  1 0 | DR0  7─────0 |
| 1 | AR1  7─────0 | CR1  1 0 | DR1  7─────0 |
| 2 | AR2  7─────0 | CR2  1 0 | DR2  7─────0 |
| 3 | AR3  7─────0 | CR3  1 0 | DR3  7─────0 |
| 4 | AR4  7─────0 | CR4  1 0 | DR4  7─────0 |
| 5 | AR5  7─────0 | CR5  1 0 | DR5  7─────0 |
| 6 | AR6  7─────0 | CR6  1 0 | DR6  7─────0 |
| 7 | AR7  7─────0 | CR7  1 0 | DR7  7─────0 |

MICROCONTROLLER AND ELECTRONIC CONTROL UNIT

CROSS-REFERENCE TO RELATED APPLICATION

The present application is a continuation of U.S. patent application Ser. No. 12/706,938, filed Feb. 17, 2010, now U.S. Pat. No. 8,291,188, which claims priority from Japanese Patent Application No. JP 2009-042510 filed on Feb. 25, 2009, the content of which is hereby incorporated by reference into this application.

TECHNICAL FIELD OF THE INVENTION

The present invention relates to a microcontroller having a plurality of central processing units (CPUs) and more particularly to improvement in the processing performance thereof and failure detection therein.

BACKGROUND OF THE INVENTION

The microcontroller is a semiconductor integrated circuit which is incorporated in equipments such as home electric appliances, AV equipments, mobile phones, automobiles and industrial machines and carries out processing in accordance with the programs stored in memories to control the respective equipments.

Since a failure of a control unit in an automobile may lead to an accident, components including the microcontroller are required to have high reliability and are designed to perform a safety function when a failure occurs so as to prevent a dangerous situation of the automobile by detecting the failure.

The microcontroller is required not only to check sensors and actuators to detect the failure thereof but also to detect a failure of the microcontroller itself.

There are various methods for detecting a failure of the microcontroller, and a method in which CPU is duplicated to cause them to carry out the same processing and the values of buses are always compared is often used. This is the method in which a master CPU and a CPU for comparison carry out the same processing at the same time, and the results thereof are compared by a comparison circuit.

Japanese Patent Application Laid-Open Publication No. 10-261762 (Patent Document 1) discloses a method in which two memories and two CPUs are provided and input/output signals of the CPUs are mutually compared.

SUMMARY OF THE INVENTION

However, in the conventional technique, the two CPUs execute the same processing at the completely same timing, and the processing performance thereof is the same as the case of one CPU. In the automotive powertrain control such as engine control and transmission control, high processing performance is required because calculation processing using a large number of sensors and control of a large number of actuators are required to be carried out in order to improve fuel efficiency and exhaust emissions.

Therefore, the demands for use of a dual-core microcontroller having two CPUs or a multi-core microcontroller having three or more CPUs are increasing.

Accordingly, an object of the present invention is to provide a microcontroller in which respective CPUs execute different applications so as to improve processing performance, and the respective CPUs execute an application that requires safety and mutually compare the results thereof so as to enhance the reliability of write data.

The above and other objects and novel characteristics of the present invention will be apparent from the description of this specification and the accompanying drawings.

The typical ones of the inventions disclosed in this application will be briefly described as follows.

That is, in a typical aspect of the present invention, a memory map register has a register storing information about the number of writes of write data, instruction processing about specific processing set in advance in the instruction processing from the CPU is executed twice for the memory map register, and a write data comparison circuit mutually collating the write data written twice to the memory map register is provided.

The effects obtained by typical embodiments of the inventions disclosed in this application will be briefly described below.

That is, as the effects obtained by the typical embodiments, high-performance processing can be carried out by using the microcontroller having the plurality of CPUs and causing the CPUs to execute different applications, respectively. At the same time, reliability of the write data can be enhanced by causing the respective CPUs to execute the application which requires safety and mutually collate the results thereof, and furthermore, safety can be enhanced because failure can also be detected.

BRIEF DESCRIPTIONS OF THE DRAWINGS

FIG. 11 is a diagram showing a configuration of the registers used in the microcontroller according to the first embodiment of the present invention;

DESCRIPTIONS OF THE PREFERRED EMBODIMENTS

Hereinafter, embodiments of the present invention will be described in detail with reference to the accompanying drawings. Note that components having the same function are denoted by the same reference numbers throughout the drawings for describing the embodiments, and the repetitive description thereof will be omitted.

(First Embodiment)

Figure 1:
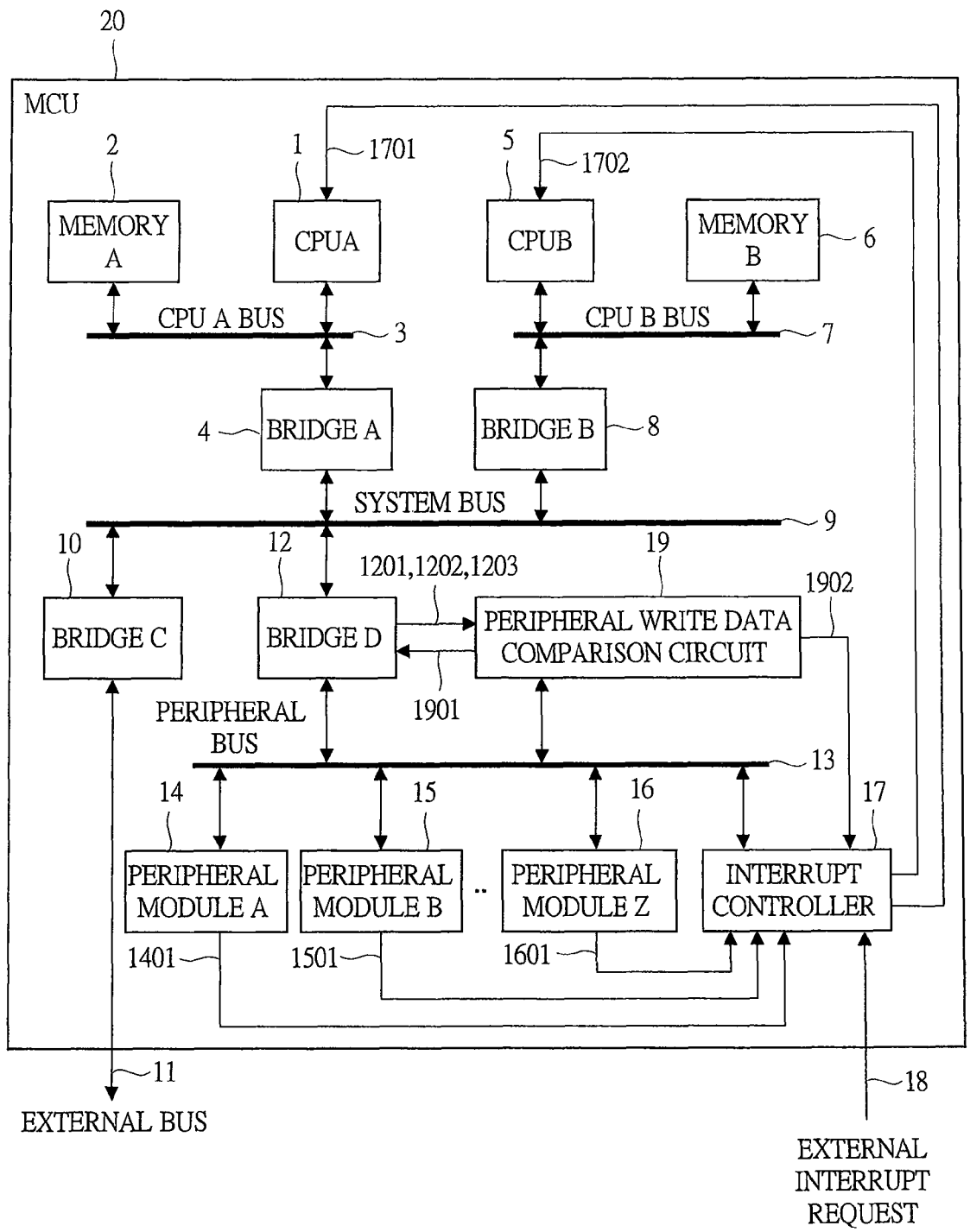
FIG. 1 is a configuration diagram showing a configuration of a microcontroller according to a first embodiment of the present invention.
Figure 2:
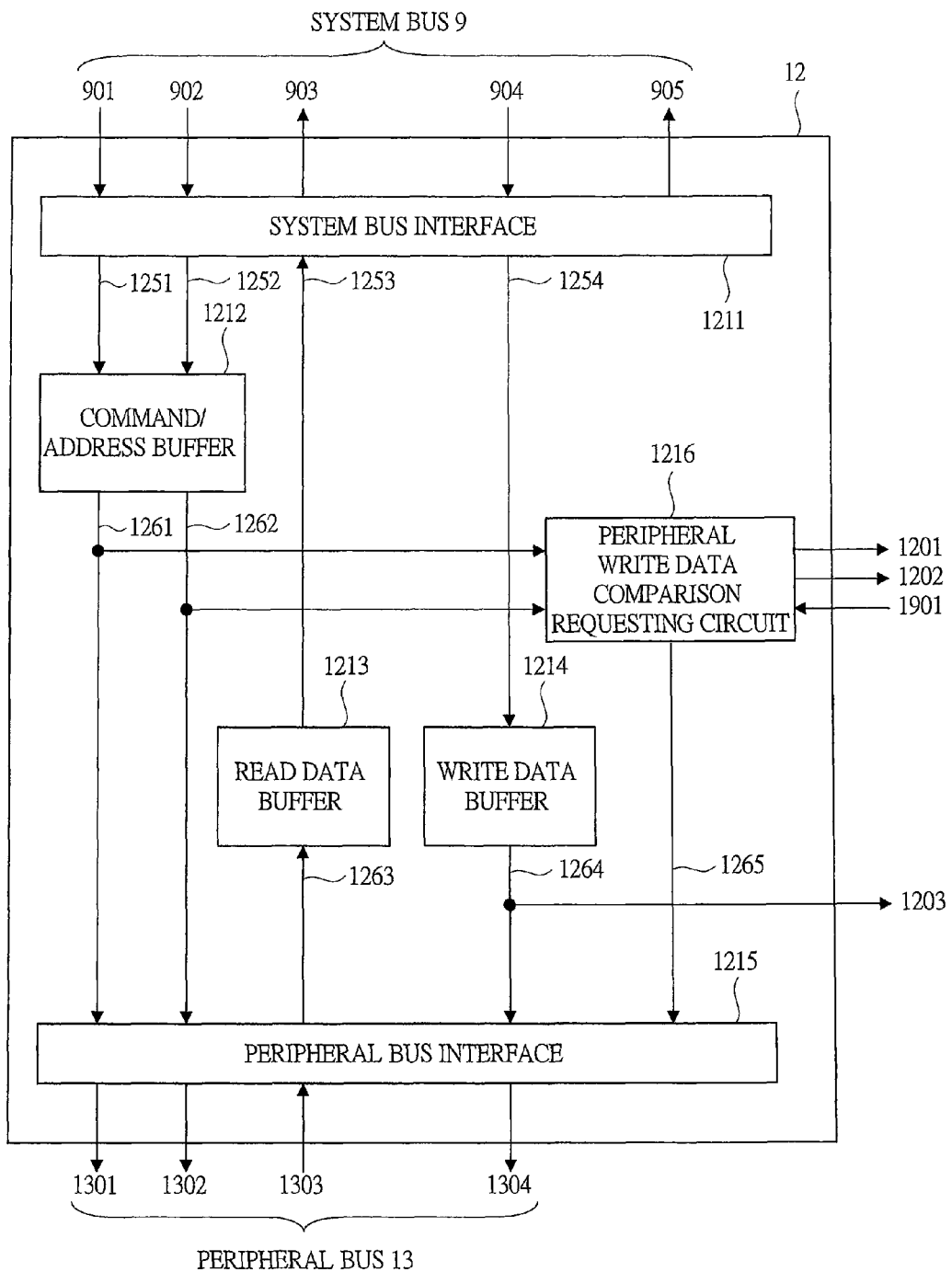
FIG. 2 is a configuration diagram showing a configuration of a bridge D of the microcontroller according to the first embodiment of the present invention.
Figure 3:
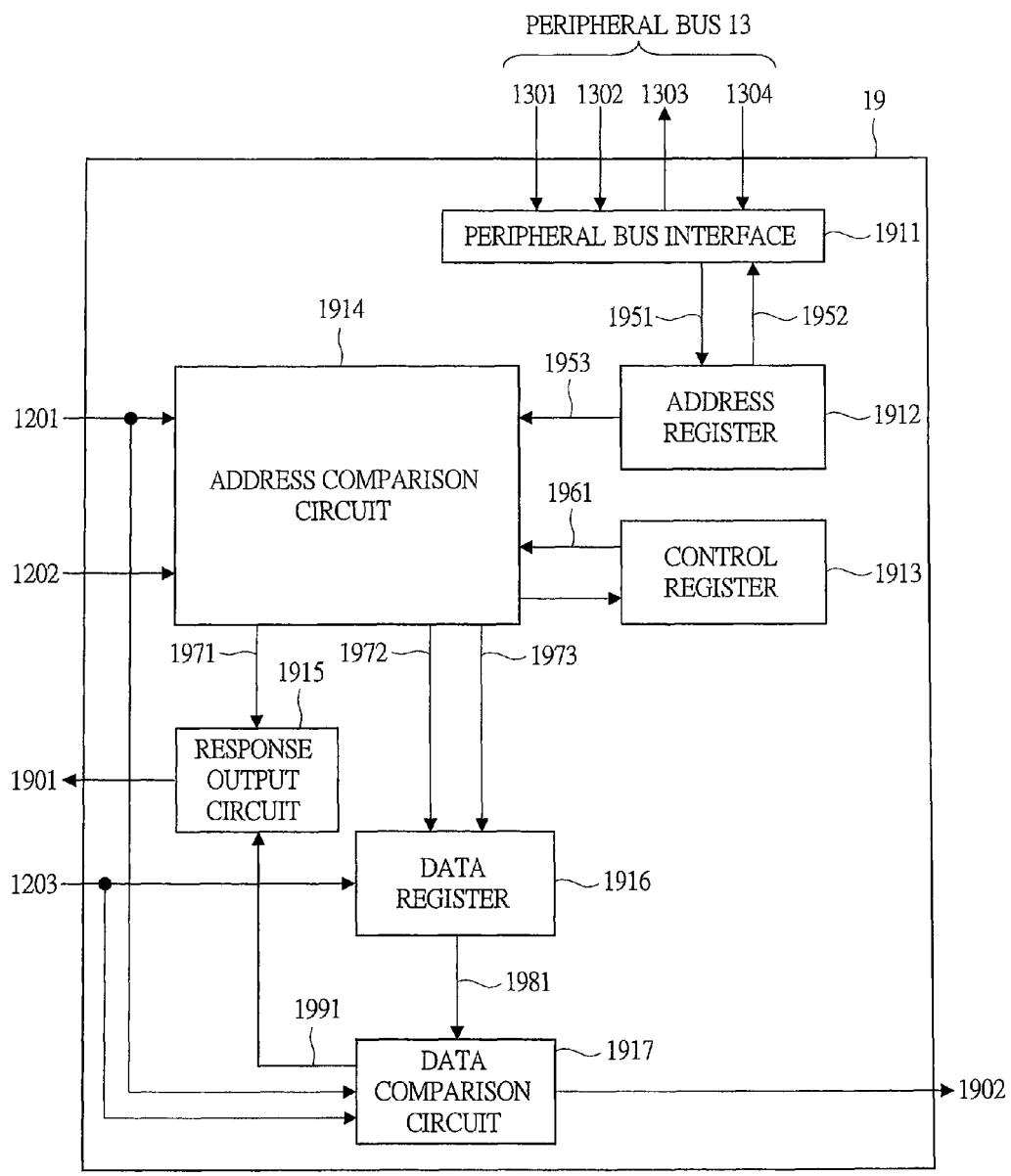
FIG. 3 is a configuration diagram showing a configuration of a peripheral write data comparison circuit of the microcontroller according to the first embodiment of the present invention.

A configuration of a microcontroller according to a first embodiment of the present invention will be described with reference to FIG. 1 to FIG. 3. FIG. 1 is a configuration diagram showing the configuration of the microcontroller according to the first embodiment of the present invention, in which a dual-core microcontroller having two CPUs is shown. FIG. 2 is a configuration diagram showing a configuration of a bridge D of the microcontroller according to the first embodiment of the present invention, and FIG. 3 is a configuration diagram showing a configuration of a peripheral write data comparison circuit of the microcontroller according to the first embodiment of the present invention.

In FIG. 1, the microcontroller (MCU) 20 is made up of a CPU A 1, a memory A 2, a CPU A bus 3, a bridge A 4, a CPU B 5, a memory B 6, a CPU B bus 7, a bridge B 8, a system bus 9, a bridge C 10, an external bus 11, a bridge D 12, a peripheral bus 13, a peripheral module A 14, a peripheral module B 15, ..., a peripheral module Z 16, an interrupt controller 17 and a peripheral write data comparison circuit 19.

The CPU A 1 is a processor which executes instructions and carries out processing such as calculations and data transfer. The memory A 2 stores the instructions to be executed and the data to be processed by the CPU A 1. The CPU A bus 3 is a bus by which the CPU A 1 accesses modules such as the memory A 2.

The bridge A 4 is a controller which controls the connection between the CPU A bus 3 and the system bus 9 in the case where the CPU A 1 accesses a module connected to the outside of the system bus 9.

The CPU B 5 is a processor which executes instructions and carries out processing such as calculations and data transfer. The memory B 6 stores the instructions to be executed and the data to be processed by the CPU B 5. The CPU B bus 7 is a bus by which the CPU B 5 accesses modules such as the memory B 6.

The bridge B 8 is a controller which controls the connection between the CPU B bus 7 and the system bus 9 in the case where the CPU B 5 accesses a module connected to the outside of the system bus 9.

The bridge C 10 is a controller which controls the connection between the system bus 9 and the external bus 11 in the case where the CPU A 1 or the CPU B 5 accesses the external bus 11.

The bridge D 12 is a controller which controls the connection between the system bus 9 and the peripheral bus 13 in the case where the CPU A 1 or the CPU B 5 accesses peripheral modules such as the peripheral module A 14, the peripheral module B 15, ..., the peripheral module Z 16 and the interrupt controller 17 connected to the peripheral bus 13.

The peripheral bus 13 is a bus to which the peripheral module A 14, the peripheral module B 15, ..., the peripheral module Z 16 and the interrupt controller 17 are connected.

The peripheral module A 14, the peripheral module B 15, ..., and the peripheral module Z 16 are connected to a communication line and the like to the outside of the microcontroller 20 and carry out mutual data transmissions with the outside of the microcontroller and control of a control circuit and the like outside the microcontroller in accordance with the write data written to the memory map register.

The interrupt controller 17 outputs interrupt signals to the CPU A 1 and the CPU B 5 in accordance with data from the peripheral module A 14, the peripheral module B 15, ..., and the peripheral module Z 16 and an external interrupt request 18.

The peripheral write data comparison circuit 19 compares the write data written to the memory map register of the peripheral modules of the CPU A 1 and the CPU B 5.

In FIG. 2, the bridge D 12 is made up of a system bus interface 1211, a command/address buffer 1212, a read data buffer 1213, a write data buffer 1214, a peripheral bus interface 1215 and a peripheral write data comparison requesting circuit 1216.

The system bus interface 1211 is connected to the system bus 9 and carries out mutual data transmissions.

The command/address buffer 1212 buffers commands and addresses from the system bus 9.

The read data buffer 1213 buffers read data from the peripheral bus 13, and the write data buffer 1214 buffers write data to the peripheral bus 13.

The peripheral bus interface 1215 is connected to the peripheral bus 13 and carries out mutual data transmissions.

The system bus 9 includes a command 901, an address 902, read data 903, write data 904 and wait 905. The system bus interface 1211 carries out inputs and outputs of various signals of the system bus 9. Signals 1251, 1252, 1253 and 1254 are the commands, addresses, read data and write data of the system bus 9 in the bridge D 12.

The command/address buffer 1212 retains system bus commands 1251 and addresses 1252. A command buffer output 1261 and an address buffer output 1262 are input to the peripheral write data comparison requesting circuit 1216.

In the case of a read access, the peripheral write data comparison requesting circuit 1216 does not output a request signal 1201, and the peripheral bus interface 1215 outputs a peripheral bus command 1301 and a peripheral bus address 1302 to start the read access.

When peripheral bus read data 1303 is read, the data is retained in the read data buffer 1213, the buffer output 1253 is output to the system bus read data 903, and the read access is completed.

In the case of a write access, the peripheral write data comparison requesting circuit 1216 outputs the request signal 1201 and an address 1202.

If it is not a comparison target, a response signal 1901 indicates that the write is single write, and write execution is output to the peripheral bus control 1265 to cause the peripheral bus interface 1215 to execute the write access.

If it is a comparison target and first access, the response signal 1901 indicates that the write is first write of dual write, nullification is output to the peripheral bus control 1265 to complete the processing without causing the peripheral bus interface 1215 to execute the write access.

If it is a comparison target and second access, the response signal 1901 indicates that the write is second write of the dual write, and whether the result is match or mismatch is subsequently notified. If the result is match, write execution is output to the peripheral bus control 1265 to cause the peripheral bus interface 1215 to execute the write access. If the result is mismatch, nullification is output to the peripheral bus control 1265 to complete the processing without causing the peripheral bus interface 1215 to execute the write access.

In FIG. 3, the peripheral write data comparison circuit 19 is made up of a peripheral bus interface 1911, an address register 1912, a control register 1913, an address comparison circuit 1914, a response output circuit 1915, a data register 1916 and a data comparison circuit 1917.

The peripheral bus interface 1911 is connected to the peripheral bus 13 and carries out mutual data transmissions.

The address register 1912, the control register 1913 and the data register 1916 store respective corresponding data.

The data comparison circuit 1917 and the address comparison circuit 1914 carry out comparison of data and addresses, and the response output circuit 1915 outputs the responses based on the comparison results from the data comparison circuit 1917 and the address comparison circuit 1914.

If the access of the system bus 9 is the write to the peripheral module, the bridge D 12 outputs the request signal 1201 of a comparison request and the address 1202 to the peripheral write data comparison circuit 19. The peripheral write data comparison circuit 19 determines whether the address 1202 is a comparison target and returns the response signal 1901. If it is not a comparison target, the bridge D 12 controls the connection between the system bus 9 and the peripheral bus 13 to the execute write access.

If it is a comparison target, the response signal 1901 indicates whether it is a first access or a second access. In the case of the first access, write data 1203 output from the bridge D 12 is stored in the peripheral write data comparison circuit 19, and the bridge D 12 does not execute the write access to the peripheral module.

In the case of the second access, the write data 1203 output from the bridge D 12 is compared with the data of the first access stored in the peripheral write data comparison circuit 19 and the result whether it is match or mismatch is returned as the response signal 1901.

When the response signal 1901 indicates the match, the bridge D 12 executes the write access to the peripheral module. In the case of the mismatch, the bridge D 12 does not execute the write access, and the peripheral write data comparison circuit 19 outputs an interrupt request 1902 to the interrupt controller 17.

The peripheral bus 13 includes the data of the command 1301, the address 1302, the read data 1303 and the write data 1304. The peripheral bus interface 1911 carries out write and read of data from the peripheral bus 13 to the address register 1912.

Peripheral-module register addresses to be targets of the write access which involves comparison are registered in the address register 1912. The control register 1913 retains the number of writes to the addresses registered in the address register 1912.

The address comparison circuit 1914 decodes the request signal 1201 of a peripheral write data comparison request output from the bridge D, and in the case of ACHK, it checks whether the address input 1202 is registered in the address register 1912. If it is not registered therein, this write is determined to be single write which does not involve comparison, and the response output circuit 1915 outputs SW to the response 1901.

If the address is registered therein, the number of writes is read from the control register 1913. In the case of a first write, the response output circuit 1915 outputs DW1 (first write of dual write) to the response 1901, and the write data input 1203 is written to the data register 1916 in a next cycle.

In the case of a second write, the response output circuit 1915 outputs DW2 (second write of the dual write) to the response 1901, and the write data input 1203 is compared with the first write data read from the data register 1916 by the data comparison circuit 1917 in a next cycle. A signal 1991 indicates whether the comparison result is match or mismatch. In the case of mismatch, an interrupt request 1902 to the interrupt controller is output.

Figure 4:
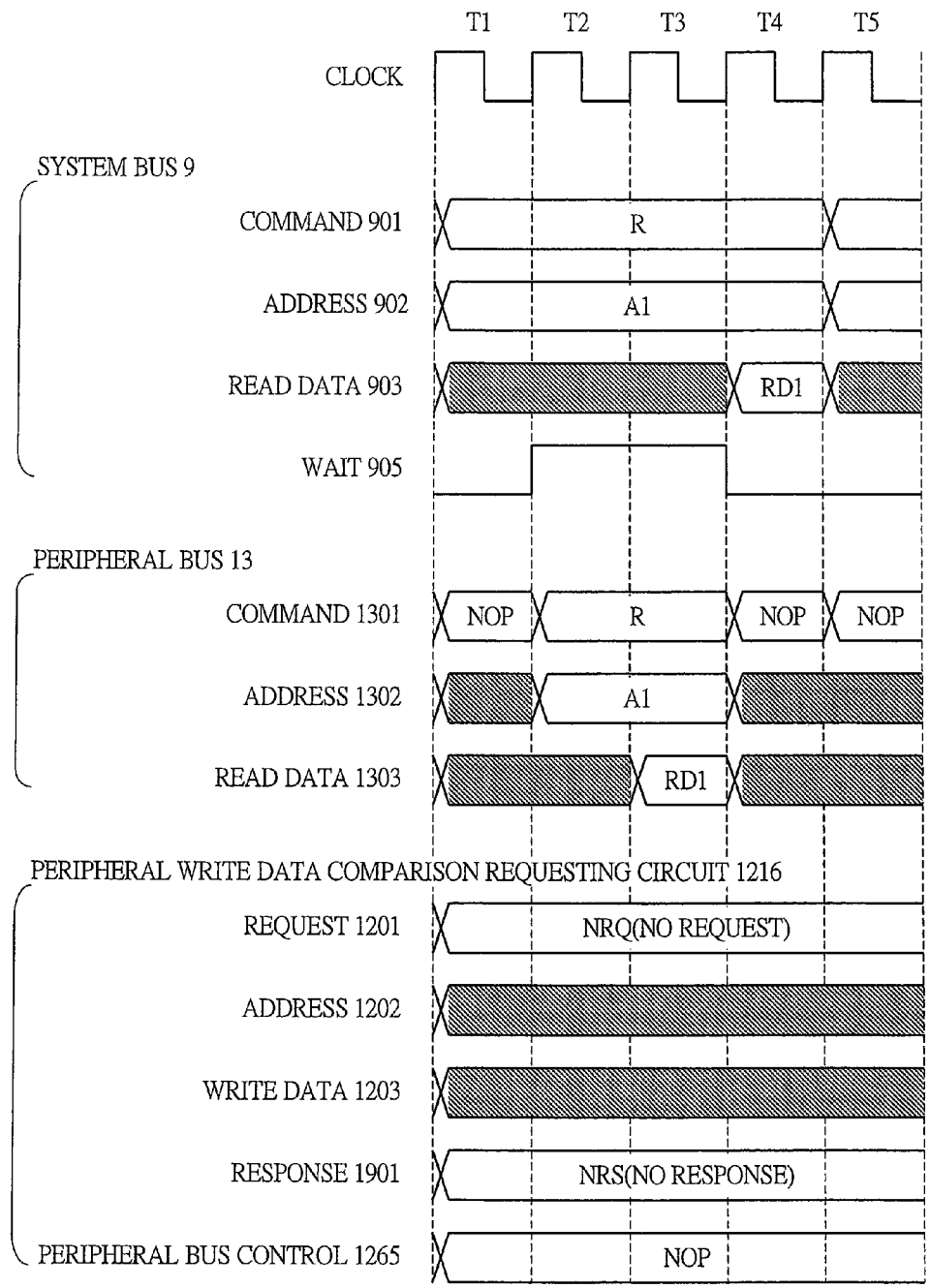
FIG. 4 is a timing chart of a read access to a peripheral module of the microcontroller according to the first embodiment of the present invention.
Figure 5:
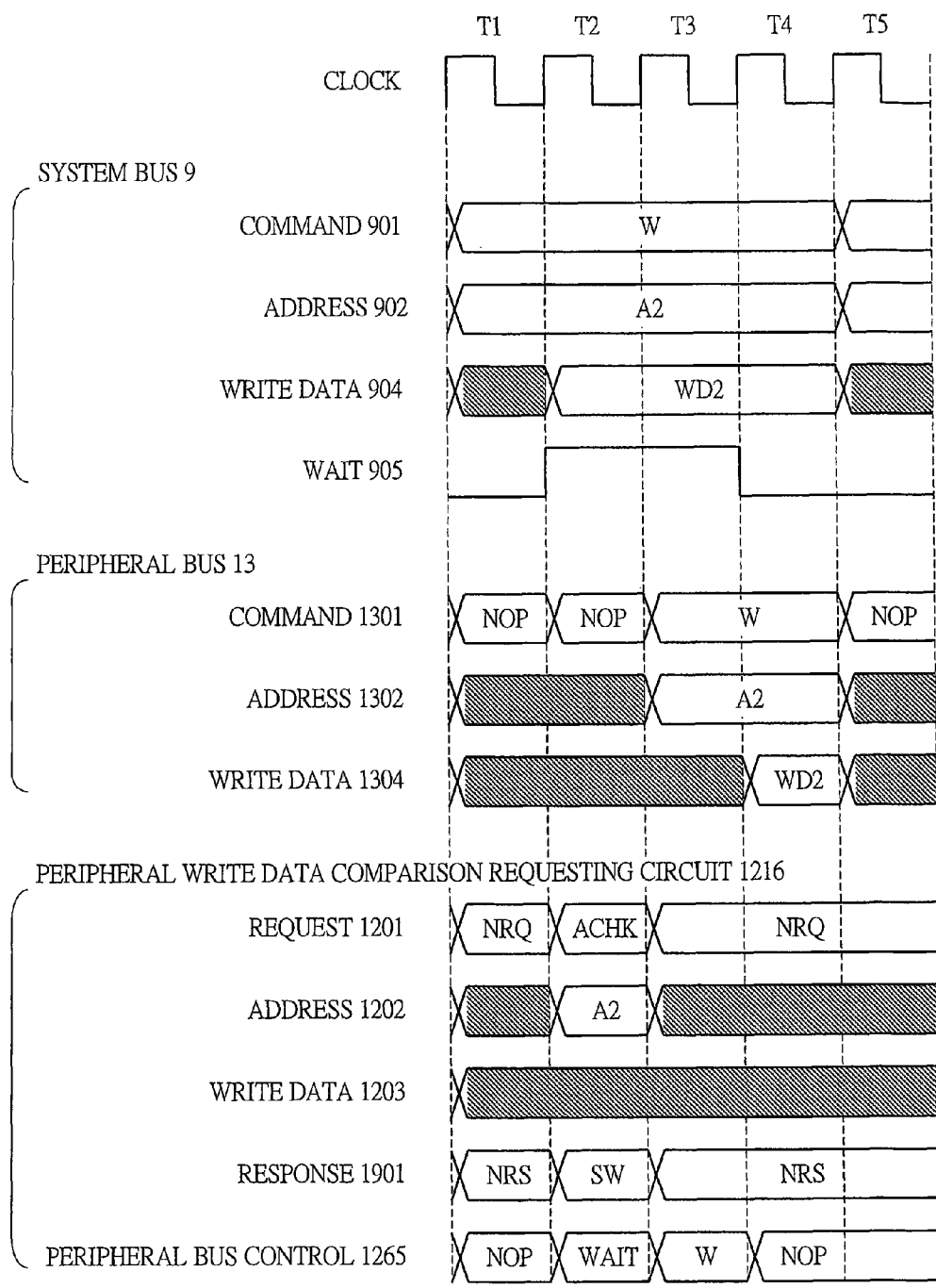
FIG. 5 is a timing chart of a write access, which does not involve comparison, to the peripheral module of the microcontroller according to the first embodiment of the present invention.
Figure 6:
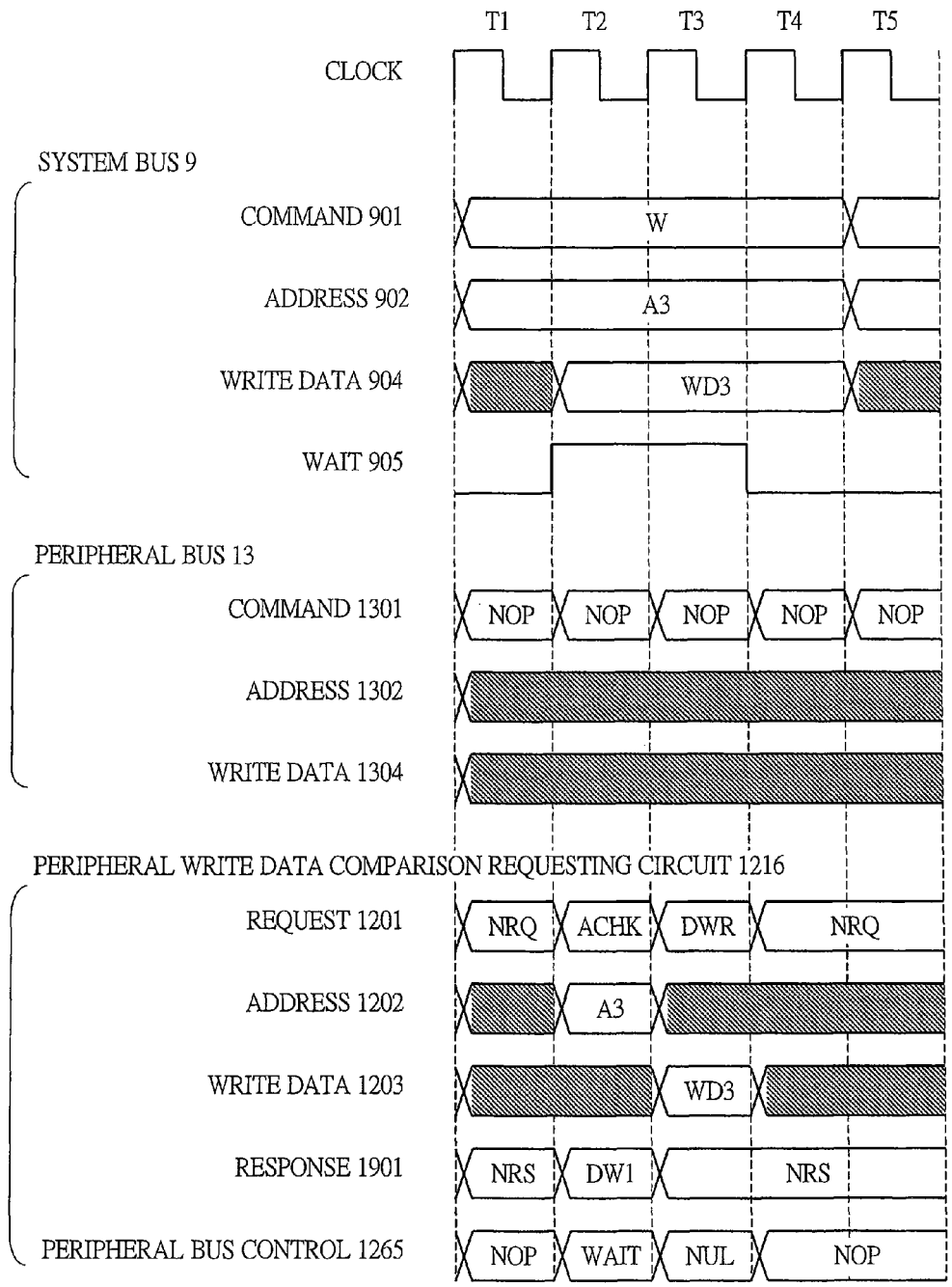
FIG. 6 is a timing chart of a first write access, which involves comparison, to the peripheral module of the microcontroller according to the first embodiment of the present invention.
Figure 7:
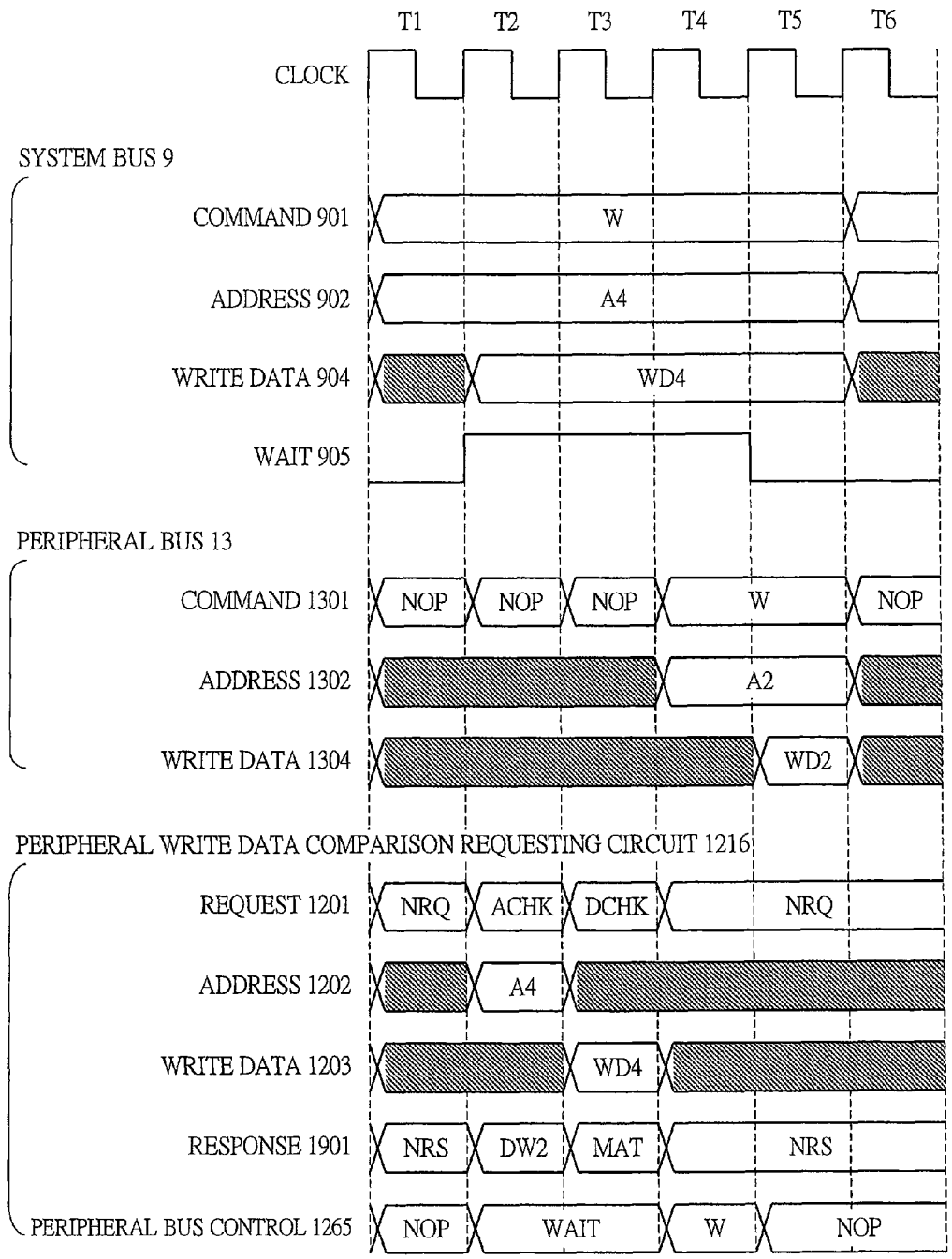
FIG. 7 is a timing chart in the case where a comparison result is match in a second write access, which involves comparison, to the peripheral module of the microcontroller according to the first embodiment of the present invention.
Figure 8:
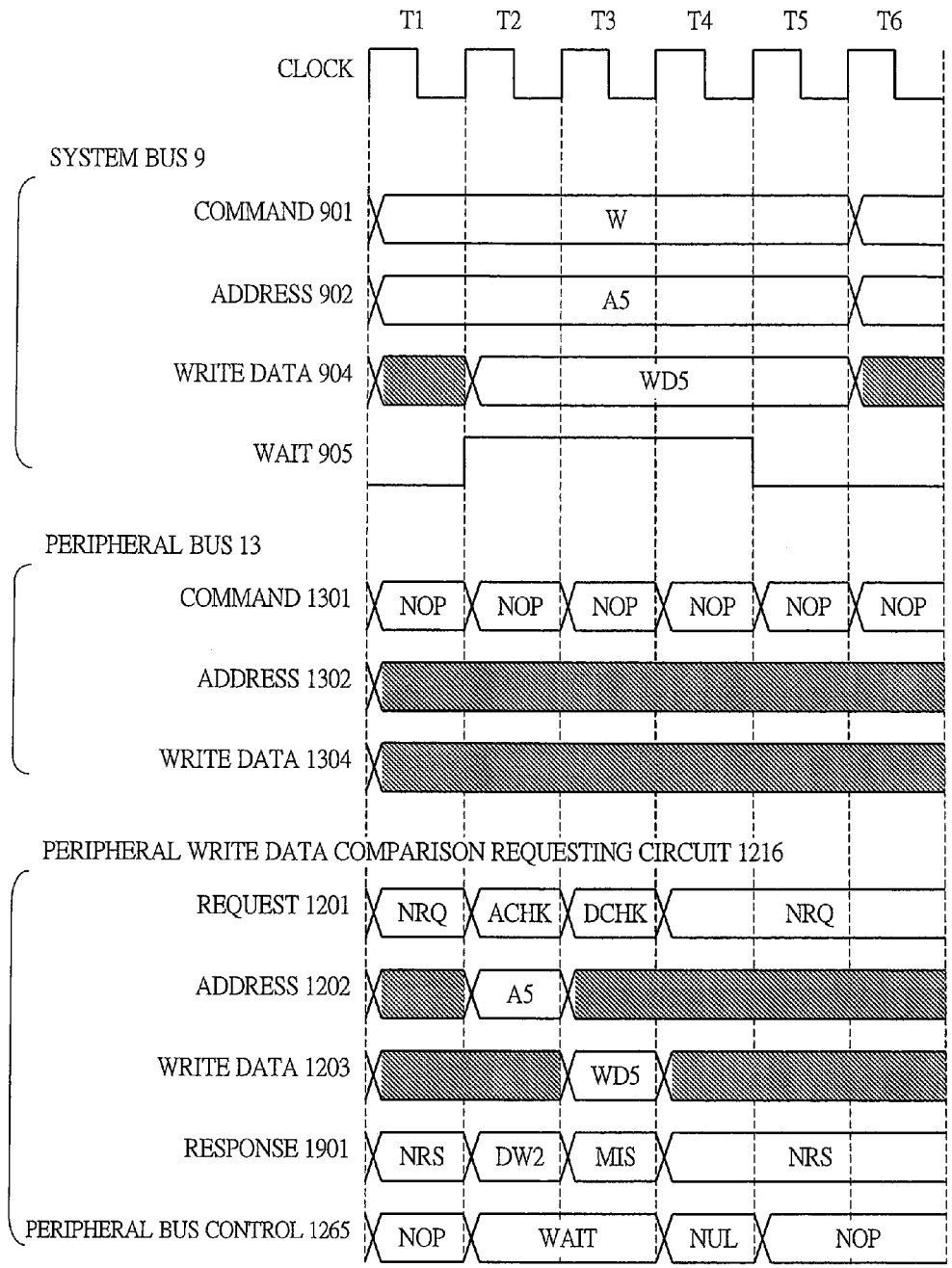
FIG. 8 is a timing chart in the case where a comparison result is mismatch in the second write access, which involves comparison, to the peripheral module of the microcontroller according to the first embodiment of the present invention.

Next, operations of the microcontroller according to the first embodiment of the present invention will be described with reference to FIG. 4 to FIG. 11. FIG. 4 to FIG. 8 are diagrams showing timing charts of the access to the peripheral module of the microcontroller according to the first embodiment of the present invention. FIG. 4 is a timing chart of the read access to the peripheral module, FIG. 5 is a timing chart of the write access, which does not involve comparison, to the peripheral module, FIG. 6 is a timing chart of the first write access, which involves comparison, to the peripheral module, FIG. 7 is a timing chart in the case where the comparison result is match in the second write access, which involves comparison, to the peripheral module, and FIG. 8 is a timing chart in the case where the comparison result is mismatch in the second write access, which involves comparison, to the peripheral module.

Figure 9:
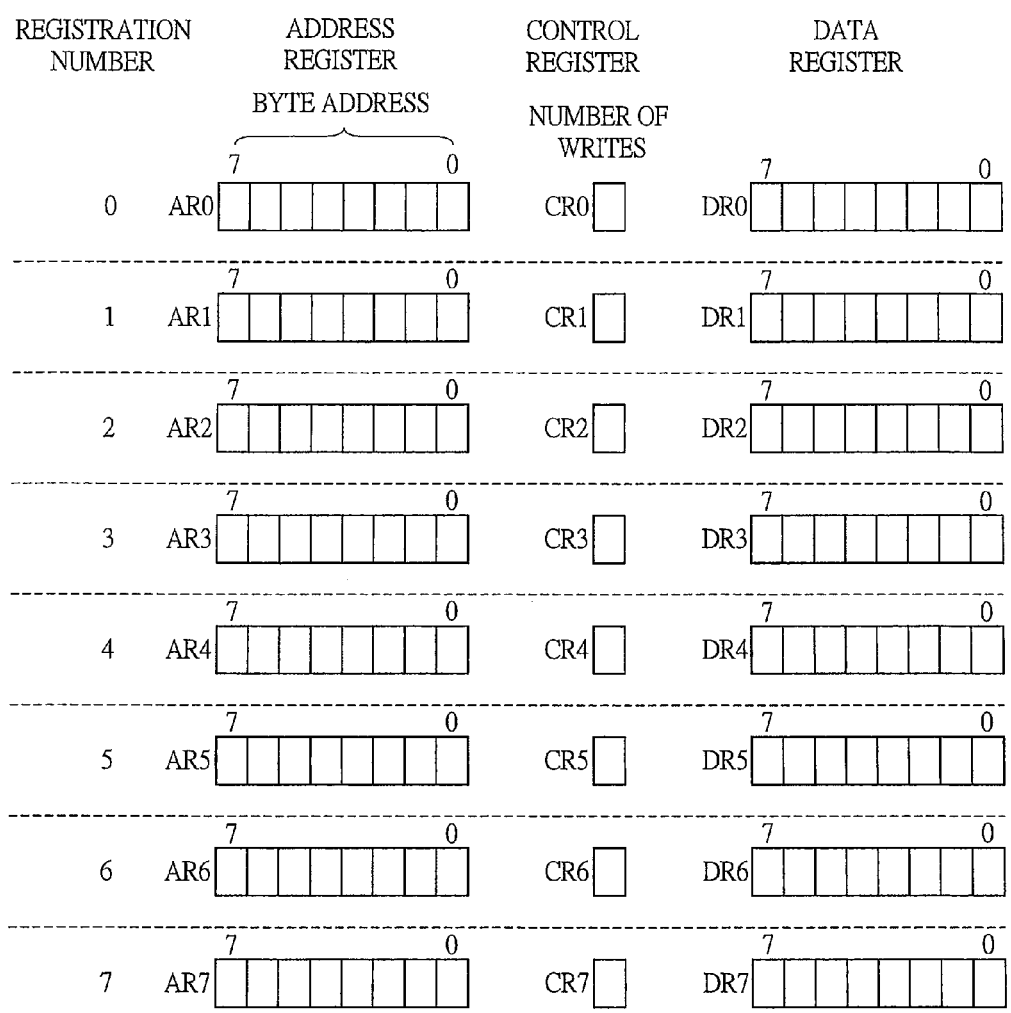
FIG. 9 is a diagram showing a configuration of registers used in the microcontroller according to the first embodiment of the present invention.
Figure 10:
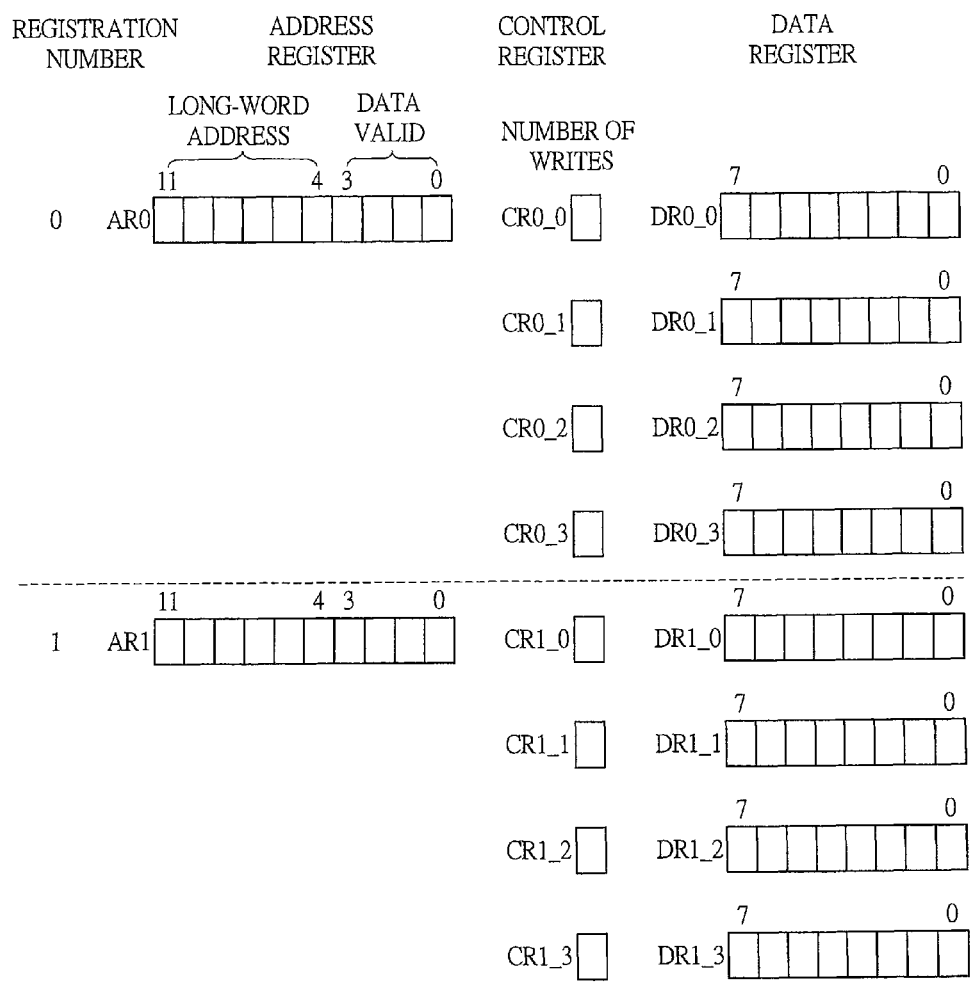
FIG. 10 is a diagram showing a configuration of the registers used in the microcontroller according to the first embodiment of the present invention.

FIG. 9 to FIG. 11 are diagrams showing configurations of the registers which are the memory map registers used in the microcontroller according to the first embodiment of the present invention, and the diagrams show different configurations, respectively.

First of all, as shown in FIG. 4, in the timing chart of the read access to the peripheral module, R (read) is output to the command 901 of the system bus 9 and a value A1 is output to the address 902 in a cycle with a clock of T1.

Since read cannot be carried out for the read data 903 in a next cycle T2, the wait 905 is set to High so as to cause the read access to wait. The peripheral write data comparison requesting circuit 1216 sets the request signal 1201 to NRQ (NO REQUEST), the peripheral bus command 1301 and the address 1302 are output in the cycle T2, and the value RD1 of the read data 1303 read in a cycle T3 is output to the system bus read data 903 in a next cycle T4, thereby completing the read access.

As shown in FIG. 5, in the timing chart of the write access, which does not involve comparison, to the peripheral module, W (write) is output to the command 901 of the system bus 9 and a value A2 is output to the address 902 in a cycle with a clock of T1.

In a next cycle T2, a value WD2 is output to the write data 904. Since the write to the peripheral module is not completed, the wait 905 is set to High so as to cause the write access to wait. The peripheral write data comparison requesting circuit 1216 sets the request signal 1201 to ACHK (Address Check) and outputs a value A2 to the address 1202 in a cycle T2.

Also, the peripheral bus control 1265 is set to WAIT with respect to the peripheral bus interface 1215 so as to cause the peripheral bus access to wait. When the response signal 1901 from the peripheral write data comparison circuit 19 indicates that it is SW (single write), in a next cycle T3, the peripheral bus control 1265 is set to W (write) to output the peripheral bus command 1301 and the address 1302, and in a cycle T4, the write data 1304 is output, thereby completing the write access.

As shown in FIG. 6, in the timing chart of the first write access, which involves comparison, to the peripheral module, W is output to the command 901 of the system bus 9 and a value A3 is output to the address 902 in a cycle with a clock of T1.

In a next cycle T2, a value WD3 is output to the write data 904. Since the write to the peripheral module is not completed, the wait 905 is set to High so as to cause the write access to wait.

The peripheral write data comparison requesting circuit 1216 sets the request signal 1201 to ACHK and outputs a value A3 to the address 1202 in the cycle T2.

Also, the peripheral bus control 1265 is set to WAIT with respect to the peripheral bus interface 1215 so as to cause the peripheral bus access to wait.

When the response signal 1901 from the peripheral write data comparison circuit 19 indicates that it is DW1 (first write of dual write), the request signal 1201 is set to DWR (Data Write) and WD3 is output to the write data 1203 in a next cycle T3.

Also, the peripheral bus control 1265 is set to NUL (Nullify), the peripheral bus command 1301 is kept to be NOP (No Operation), and an access is not executed.

On the other hand, the system bus 9 sets the wait 905 to Low so as to cancel the wait of the write access, thereby completing the write access.

As shown in FIG. 7, in the timing chart in the case where the comparison result is match in the second write access, which involves comparison, to the peripheral module, W is output to the command 901 of the system bus 9 and a value A4 is output to the address 902 in a cycle with a clock of T1.

In a next cycle T2, a value WD4 is output to the write data 904. Since the write to the peripheral module is not completed, the wait 905 is set to High so as to cause the write access to wait.

In the cycle T2, the peripheral write data comparison requesting circuit 1216 sets the request signal 1201 to ACHK and outputs a value A4 to the address 1202.

Also, the peripheral bus control 1265 is set to WAIT with respect to the peripheral bus interface so as to cause the peripheral bus access to wait. When the response signal 1901 from the peripheral write data comparison circuit indicates that it is DW2 (second write of dual write), the request signal 1201 is set to DCHK (Data Check) and a value WD4 is output to the write data 1203 in a next cycle T3.

Also, the peripheral bus control 1265 is kept to be WAIT so as to cause the peripheral bus access to wait. When the response signal 1901 indicates MAT (Match), the peripheral bus control 1265 is set to W and the peripheral bus command 1301 and the address 1302 are output in a next cycle T4, and the write data 1304 is output in a cycle T5, thereby completing the write access.

Also, as shown in FIG. 8, in the timing chart in the case where the comparison result is mismatch in the second write access, which involves comparison, to the peripheral module, W is output to the command 901 of the system bus 9 and a value A5 is output to the address 902 in a cycle with a clock of T1.

In a next cycle T2, a value WD5 is output to the write data 904. Since the write to the peripheral module is not completed, the wait 905 is set to High so as to cause the write access to wait.

The peripheral write data comparison requesting circuit 1216 sets the request signal 1201 to ACHK and outputs a value A5 to the address 1202 in a cycle T2.

Also, the peripheral bus control 1265 is set to WAIT with respect to the peripheral bus interface so as to cause the peripheral bus access to wait. When the response signal 1901 from the peripheral write data comparison circuit indicates that it is DW2, the request signal 1201 is set to DCHK and the value WD5 is output to the write data 1203 in a next cycle T3.

Also, the peripheral bus control 1265 is kept to be WAIT so as to cause the peripheral bus access to wait. When the response signal 1901 indicates MIS (Mismatch), the peripheral bus control 1265 is set to NUL in a next cycle T4, the peripheral bus command 1301 is kept to be NOP, and an access is not executed.

On the other hand, the system bus 9 sets the wait 905 to Low so as to cancel the wait of the write access, thereby completing the write access.

Through the processing described above, in the case of the write access to the peripheral module, if it is a comparison target, the first and second data are compared, so that reliability of write data can be enhanced.

When the comparison result of the first and second write data is mismatch, failures of the CPU A 1, CPU B 5 and other circuits are suspected, and the failures can be detected by outputting the data indicating the failures.

As configuration examples of the address register 1912, the control register 1913 and the data register 1916 shown in FIG. 3, first of all, FIG. 9 shows an example in which eight registration numbers 0 to 7 can be registered as the peripheral module register addresses to be the targets of the write access which involves comparison.

In FIG. 9, address registers AR0 to AR7 retain the addresses using a byte as a unit, and the size thereof is an 8-bit size for simplification. Control registers CR0 to CR7 correspond to the address registers AR0 to AR7, respectively, and retain the number of writes. 0 represents no write and 1 represents one write. The data register retains the write data of a first time.

Further, the configuration shown in FIG. 10 can be also employed as the configuration of the address register 1912, the control register 1913 and the data register 1916.

In FIG. 10, the address registers are two address registers AR0 and AR1, and each register is separated to an 8-bit long-word address part and a 4-bit data valid part.

The peripheral module register address to be a target of the write access which involves comparison is four continuous bytes from the address bounded by a long word. In the data valid part of the address register, whether comparison is involved is set for each byte.

Compared with the configuration shown in FIG. 9, specification of the addresses is limited, but the size of the address register can be reduced.

Still further, the configuration shown in FIG. 11 can be also employed as the configuration of the address register 1912, the control register 1913 and the data register 1916.

In FIG. 11, compared with the configuration of FIG. 9, each of attribute registers CR0 to CR7 is changed from 1 bit to 2 bits so as to retain the number of writes and CPU numbers.

Since the CPU numbers are retained, whether the CPU numbers of the first time and the second time are different can be checked.

(Second Embodiment)

In a second embodiment, each of the peripheral module A 14, the peripheral module B 15, . . . , and the peripheral module Z 16 of the first embodiment is provided with a function of carrying out comparison of write data.

Figure 12:
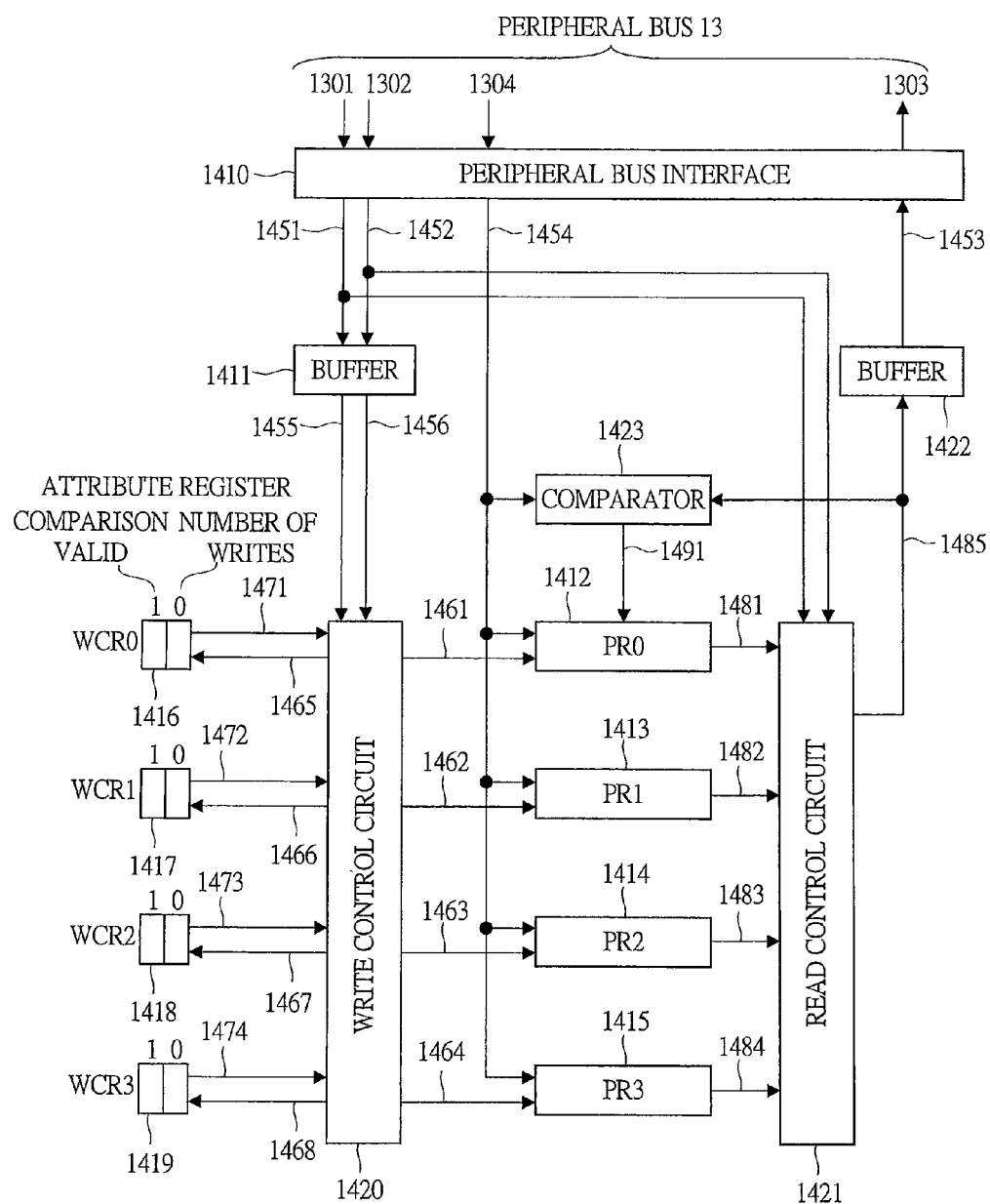
FIG. 12 is a configuration diagram showing a configuration of a peripheral module in a microcontroller according to a second embodiment of the present invention.

A configuration of the peripheral module in the microcontroller according to the second embodiment of the present invention will be described with reference to FIG. 12. FIG. 12 is a configuration diagram showing the configuration of the peripheral module in the microcontroller according to the second embodiment of the present invention.

In FIG. 12, the peripheral module is made up of a peripheral bus interface 1410, a buffer 1411, peripheral registers PR0 to PR3 (1412 to 1415), attribute registers WCR0 to WCR3 (1416 to 1419), a write control circuit 1420, a read control circuit 1421, a buffer 1422 and a comparator 1423.

In the peripheral registers PR0 to PR3 (1412 to 1415), write and read of data with respect to an access from the peripheral bus 13 are carried out.

The attribute registers WCR0 to WCR3 (1416 to 1419) have a comparison valid bit and a bit of the number of writes for the peripheral registers PR0 to PR3 (1412 to 1415), respectively.

For example, when comparison is valid and first write has not been carried out in the peripheral register PR0 (1412), the comparison valid bit of the attribute register WCR0 (1416) is 1 (valid), and the number of writes is 0. When the write to the peripheral register PR0 (1412) is carried out, the write control circuit 1420 reads data 1471 of the attribute register WCR0 (1416), changes the number of writes to 1, and writes it back to the attribute register WCR0 (1416).

When second write to the peripheral register PR0 (1412) is carried out, the write control circuit 1420 reads the data 1471 of the attribute register WCR0 (1416), changes the number of writes to 0, and writes it back to the attribute register WCR0 (1416).

Meanwhile, the read control circuit 1421 reads the data, which is written in the first write, from the peripheral register PR0 (1412).

The comparator 1423 compares the first write data 1485, which is read by the read control circuit 1421, with second write data 1454.

The peripheral register PR0 (1412) is a status register and has a comparison result flag. An output 1491 of the comparator 1423 is written to a comparison result register of the peripheral register PR0 (1412). Based on the comparison result written to the comparison result register of the peripheral register PR0 (1412), control of the peripheral module itself and control of other circuits and others are carried out.

Similar processing is carried out also for the other peripheral registers PR1 to PR3 (1413 to 1415) and the attribute registers WCR1 to WCR3 (1417 to 1419).

In the present embodiment, comparison of write data can be carried out also in the peripheral modules.

(Third Embodiment)

In a third embodiment, each of the peripheral module A 14, the peripheral module B 15, . . . , and the peripheral module Z 16 of the second embodiment is provided with the function of carrying out comparison of write data with a different configuration.

Figure 13:
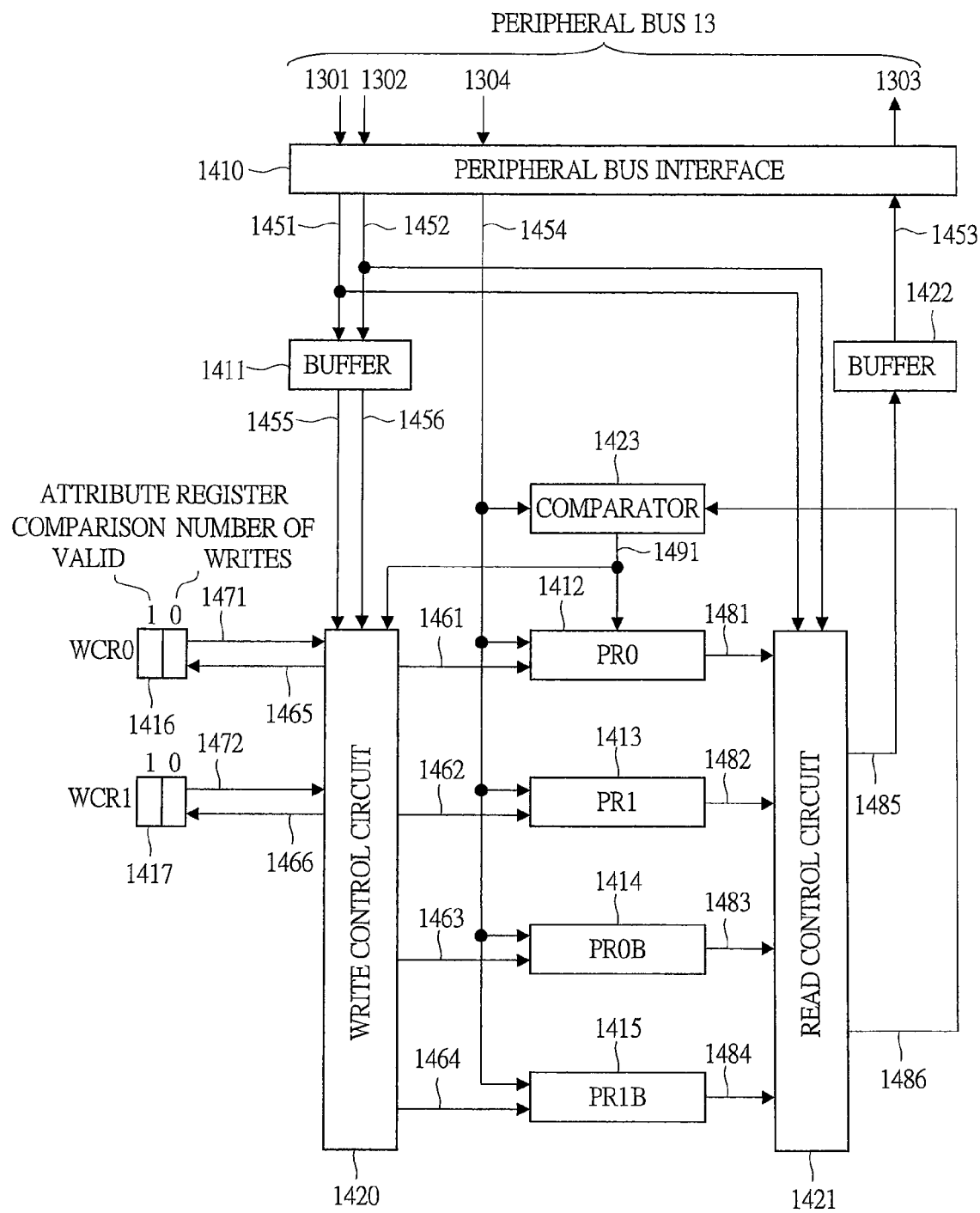
FIG. 13 is a configuration diagram showing a configuration of a peripheral module in a microcontroller according to a third embodiment of the present invention.

The configuration of the peripheral module in the microcontroller according to the third embodiment of the present invention will be described with reference to FIG. 13. FIG. 13 is a configuration diagram showing the configuration of the peripheral module in the microcontroller according to the third embodiment of the present invention.

In FIG. 13, there are four peripheral registers (PR0, PR1, PR0B and PR1B) (1412 to 1415), which is the same when compared with FIG. 12 of the second embodiment, but the number of the registers is substantially two because the peripheral register PR0B 1414 is a backup of the peripheral register PR0 (1412) and the peripheral register PR1B 1415 is a backup of the peripheral register PR1 (1413).

The peripheral register PR0B 1414 and the peripheral register PR1B 1415 retain first write data, respectively.

In second write, the first write data 1486 is compared with second write data 1454 by the comparator 1423, and a result 1491 thereof is written to a comparison result flag of the peripheral register PR0 (1412). The comparison result 1491 is input also to the write control circuit 1420, and in the case of mismatch, write to the peripheral register PR0 (1412) and the peripheral register PR1 (1413), which are substantial registers, is prevented.

In the present embodiment, comparison of write data can be carried out also in the peripheral modules. Moreover, since the comparison of write data is carried out by using the backups of the peripheral registers, the comparison of write data can be carried out without affecting the peripheral register PR0 (1412) and the peripheral register PR1 (1413), which are the substantial registers.

(Fourth Embodiment)

A forth embodiment is an automobile electronic control unit using the microcontroller having the function of collating the write data to the peripheral modules of any of the first to third embodiments.

Figure 14:
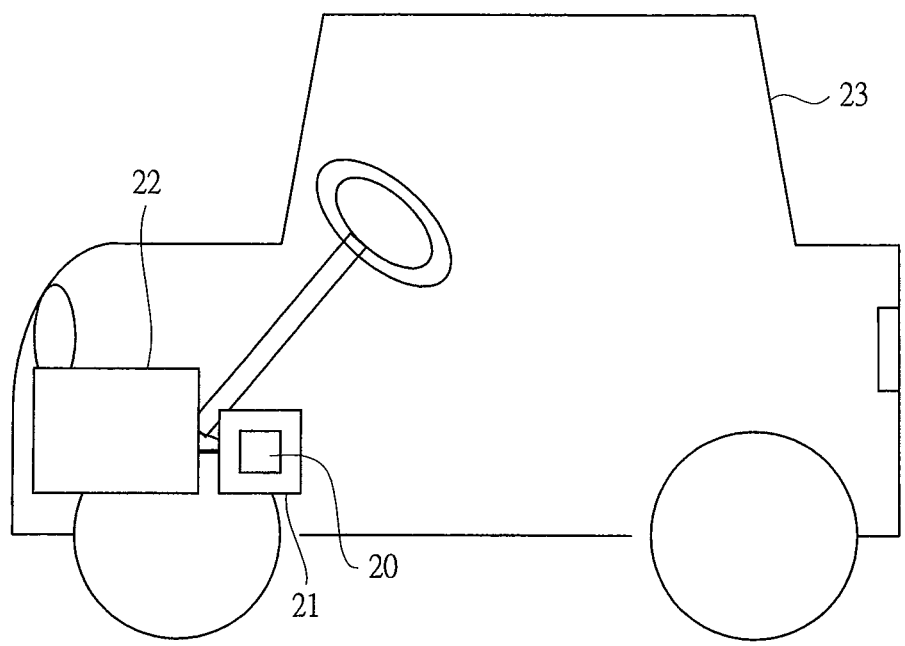
FIG. 14 is an explanatory diagram for describing an automobile electronic control unit using a microcontroller according to any of the embodiments of the present invention.

The automobile electronic control unit using the microcontroller according to any of the embodiments of the present invention will be described with reference to FIG. 14. FIG. 14 is an explanatory diagram for describing the automobile electronic control unit using the microcontroller according to any of the embodiments of the present invention.

In FIG. 14, the automobile electronic control unit 21 is disposed as a device which electronically controls an engine 22 in an automobile 23. The microcontroller having the function of collating the write data to the peripheral modules of any of the first to third embodiments is mounted in the automobile electronic control unit 21 and carries out overall control of the automobile electronic control unit 21.

When the microcontroller having the function of collating the write data to the peripheral modules is used in the automobile electronic control unit 21 which electronically controls the engine 22 of the automobile 23 as shown in FIG. 14, the electronic control of the engine 22 of the automobile 23 can be processed at high speed, and safety can also be enhanced.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, the first embodiment is described based on the example of two CPUs. However, the present invention can be applied to the case of one CPU. In the case of one CPU, data write is normally executed by one write processing, and data write is executed by two write processings only in specific processing. By this means, processing of the CPU can be reduced, and reliability can be enhanced for the write data for which two write processings are executed.

Also, in the first embodiment, comparison of the write data is executed by the peripheral write data comparison circuit 19. However, the comparison processing of write data may be executed in the bridge D 12 by giving this function of the peripheral write data comparison circuit 19 to the bridge D 12.

Further, in the first embodiment, the registers serving as the memory map register are disposed in the peripheral module A 14, the peripheral module B 15, . . . , and the peripheral module Z 16. However, the registers may be disposed anywhere as long as the registers are disposed in the microcontroller 20 and control is carried out based on the write data to the memory map register.

The present invention relates to a microcontroller having a plurality of CPUs, and the present invention can be widely applied to the microcontroller used in a device in which a higher processing ability and safety are required.

What is claimed is:

1. A microcontroller comprising: a CPU; a plurality of peripheral modules; a memory map register; a peripheral write data comparison circuit; and a peripheral write data comparison requesting circuit, the microcontroller carrying out control of an external device by accessing the plurality of peripheral modules based on an instruction processing from the CPU,
wherein when an access request from the CPU occurs, it is confirmed in the peripheral write data comparison requesting circuit whether the access request is a write data request, if it is the write data request from the CPU, the access request from the CPU is sent to the peripheral write data comparison circuit, and write data is sent to the peripheral write data comparison circuit twice, and
wherein the peripheral write data comparison circuit inputs the write data sent first and the number of writes thereof to the memory map register, and compares the write data sent second with the write data sent first stored in the memory map register, and if they match, the peripheral write data comparison circuit transfers the write data to the peripheral module.

2. The microcontroller according to claim 1,
wherein two transmissions of the write data in a case of the write data request are executed by instruction processing from another CPU in the CPU.

3. The microcontroller according to claim 1,
wherein the memory map register has a register that stores information about the CPU that executes writing of the write data.

4. The microcontroller according to claim 1,
wherein the memory map register has an address register that registers a peripheral module register address to be a target of a write access which involves the comparison of the write data.

5. The microcontroller according to claim 1,
wherein the peripheral write comparison circuit has an address comparison circuit and a data comparison circuit.

6. The microcontroller according to claim 5,
wherein the peripheral write data comparison requesting circuit is disposed in a bridge which carries out a memory map access control.

7. The microcontroller according to claim 5,
wherein the address comparison circuit outputs the write data to the peripheral module when input address is not registered in an address register.

* * * * *